United States Patent [19]
Chompff

[11] 3,880,948
[45] Apr. 29, 1975

[54] RUBBER REINFORCED POLYAMIDES
[75] Inventor: Alfred J. Chompff, Southfield, Mich.
[73] Assignee: Ford Motor Company, Dearborn, Mich.
[22] Filed: Oct. 25, 1973
[21] Appl. No.: 409,519

Related U.S. Application Data
[63] Continuation-in-part of Ser. No. 306,463, Nov. 14, 1972, abandoned.

[52] U.S. Cl............ 260/835; 260/830 P; 260/836; 260/837 R
[51] Int. Cl... C08g 45/14; C08g 45/12; C08g 45/04
[58] Field of Search........ 260/830 P, 836, 837, 835

[56] References Cited
UNITED STATES PATENTS

| | | | |
|---|---|---|---|
| 3,576,903 | 4/1971 | Groff | 260/835 |
| 3,629,226 | 12/1971 | Lohse | 260/835 |
| 3,641,194 | 2/1972 | Schmid | 260/835 |
| 3,678,127 | 7/1972 | Schmid | 260/835 |
| 3,758,633 | 9/1973 | Labana | 260/837 |
| 3,781,380 | 12/1973 | Labana | 260/837 |

*Primary Examiner*—Paul Lieberman
*Attorney, Agent, or Firm*—Roger L. May; Keith L. Zerschling

[57] ABSTRACT

Thermoplastic, rubber-reinforced, high-impact polyamides which consist of a polyamide matrix containing a crosslinked, elastomeric, dispersed phase grafted to the matrix at their interfaces are prepared by (1) reacting a carboxyl-bearing polymer with a diepoxide to form a hydroxy- and epoxy-functional reaction produce that is both self-crosslinkable and capable of reacting with amide groups and (2) blending, in the liquid state, the hydroxy- and epoxy-functional reaction product.

24 Claims, No Drawings

RUBBER REINFORCED POLYAMIDES

This application is a Continuation-In-Part of Ser. No. 306,463 filed Nov. 14, 1972 and now abandoned.

THE INVENTION

This invention relates to the field of structural plastics. In particular, it relates to high-impact, rubber-reinforced, polyamides which are useful as structural materials over wide temperature and humidity ranges. These reinforced polyamides exhibit elongation-to-break measurements at room temperature, i.e., 20°C to 25°C, which are more than twice those of the same polyamides without reinforcement. The reinforced polyamides have application in flexible automobile fenders, fender liners, hoods and other automobile body parts.

The rubber-modification of the polyamide is in the form of a fine dispersion of crosslinked, elastomeric particles within a polyamide matrix to which the rubber-like particles are firmly grafted at their interfaces.

The material to be dispersed is the reaction product of a carboxyl-bearing polymer and a diepoxide, each of which consists essentially of carbon, hydrogen and oxygen. The average molecular weight of the carboxyl-bearing polymer, which at least in most instances will be a copolymer, is in the range of about 1,500 to about 10,000, preferably about 3,000 to about 6,000. The average concentration of carboxyl groups in the polymer or copolymer is in the range of about 1.5 to about 4.0 preferably about 1.8 to about 2.5 per molecule.

The average molecular weight of the diepoxide is in the range of about 200 to about 1,000. Reaction of a carboxyl from the carboxyl-bearing polymer or copolymer with an epoxy group of the diepoxide opens the epoxy group with the dual result of attaching the polymer or copolymer to the diepoxide and forming a hydroxyl group. Both hydroxyl groups and epoxy groups of the resultant hydroxy-and epoxy-functional reaction product will react with amide groups of the polyamide and each other for self-crosslinking.

As mentioned above, the fine, selfcrosslinked particles which are dispersed in the polyamide matrix are elastomeric or rubber-like. To this end, the crosslinked substance preferably has a glass transition temperature (Tg) below 50°F and most preferably below −20°F. Of course, the Tg of the crosslinked substance may be controlled by the carboxyl-bearing polymer reactants. The variation in Tg which may be achieved by selecting various reactants is well known to those skilled in the art of polymer chemistry.

The blending and molding operations may be performed either separately or simultaneously by injection molding. Blending is effected in the liquid state and, for ease of dispersion, the viscosity of the material to be dispersed is initially lower than that of the polyamide. Hence, the choice of the carboxyl-bearing polymer or copolymer and diepoxide reaction product and the choice of the polyamide are interdependent with respect to viscosity. Also, as the melting temperature of the polyamide is increased, e.g., a change from nylon 6 to nylon 6,6, one uses a diepoxide that is less reactive, i.e., slower to react, to prevent premature reaction. For this purpose, one can resort to aliphatic diepoxides which are characteristically slower to react than are aromatic diepoxides.

The impact properties of this reinforced polyamide can be further modified by post-curing, quantity and choice of catalyst and by incorporating conventional particulate fillers. The catalyst is added prior to dispersion of the hydroxyl- and epoxy- functional reaction product within the liquid polyamide. Also, carbon black may be dispersed in the dispersed rubbery phase to protect the polyamide from ultraviolet deterioration.

Among the suitable carboxyl-bearing polymers are carboxyl terminated copolymers as well as copolymers containing randomly distributed carboxyl groups.

The carboxyl- terminated copolymers may be formed by conventional free radical polymerization processes from a carboxylic acid group containing radical initiator such as 4,4'-azo-bis (4-cyanopentanoic acid), 2,2'-azo-bis (4-carboxy-2-methyl butyronitrile), succinic acid peroxide, or glutaric acid peroxide, and monomers such as acrylic or methacrylic acid, an olefinically unsaturated hydrocarbon or halogen-substituted hydrocarbon such as butadiene, chloroprene, isobutylene, isoprene, styrene and methyl styrene and monomers derived from acrylic or methacrylic acid such as esters of acrylic or methacrylic acid and a $C_1$–$C_8$ monohydric alcohol, e.g., methyl methacrylate, ethyl acrylate, butyl acrylate, and 2-ethyl hexyl acrylate, acrylonitrile, methacrylonitrile, etc. The carboxyl concentration supplied from the radical initiator is advantageously supplemented by using between about 0.1 and about 3 mole percent acrylic or methacrylic acid. The total concentration of carboxyl providing components advantageously comprise between about 2 and about 4 mole percent of the carboxyl-terminated copolymer.

The carboxyl bearing copolymers containing randomly distributed carboxyl groups may also be prepared by conventional free radical polymerization processes. More specifically, the randomly distributed carboxyl groups may be provided by a monomeric carboxylic acid such as acrylic or methacrylic acid and a free radical initiator containing no carboxyl groups, e.g., benzoyl peroxide, azo bis (isobutyronitrile), etc., is employed. Additional noncarboxyl bearing monomers such as those employed in the carboxyl terminated copolymers discussed above may also be employed in the carboxyl bearing copolymers of this embodiment. Also, as was the case with the carboxyl terminated embodiment, the total concentration of carboxyl providing components advantageously comprises between about 2 and about 4 mole percent of the copolymer.

In several preferred copolymer embodiments the copolymer, which may be carboxyl terminated, carboxyl diterminated or contain randomly distributed carboxyl groups, is made up of a first component consisting of about 2 to about 4 molar parts of carboxyl providing units, i.e., monomeric compounds and/or radical initiator, and a second component consisting of monomers which do not have or provide free carboxyl groups. This second component is advantageously made up of at least about 50 molar parts, preferably at least about 65 molar parts, of olefinic hydrocarbon monomers with the remainder, if any, consisting essentially of the aforementioned acrylates, methacrylates, nitriles and mixtures of the same. Typically, such a copolymer would include about 2 to about 4 mole percent carboxyl providing units, about 50 to about 98, preferably about 70 to about 98, mole percent olefinic hydrocarbon monomers and about 0 to about 48, preferably about 10 to about 28, mole percent of monomers selected from said acrylates, methacrylates and nitriles.

A still more preferred random carboxyl bearing copolymer consists of 0 to 30 percent by weight acrylonitrile, 4 to 12 percent by weight acrylic or methacrylic acid and the remainder butadiene or isoprene.

The free radical polymerization processes may be carried out in an autoclave or other medium high-pressure reactor with provisions for heating and cooling, and using a suitable solvent or solvent mix for both monomers and initiator, e.g., tetrahydrofuran, dioxane, acetone, and t-butanol, at temperatures preferably between 80°C to 120°C and initiator concentrations preferably between 0.5 and 5 mole percent. The so formed copolymer is separated from unreacted monomers and solvents by conventional separation techniques after stabilizing the solution with a small amount of a reducing agent, e.g., 1.5% hydroquinone.

A further type of carboxyl terminated polymer suitable for reaction with diepoxides in accordance with this invention is the carboxyl terminated polyester. Preferably such a polymer is linear and has a number average molecula weight of between about 1,500 and about 5,000. These polyesters may be prepared by conventional polycondensation reactions from dicarboxylic acids and dihydroxy alcohols. Although linear polyesters are preferred, lightly branched polyesters obtained by incorporating polyfunctional alcohols or carboxylic acids in the polyester molecule can also be used provided the concentration of carboxyl groups is in excess of the alcohol group concentration resulting again in carboxyl terminated chain ends.

As discussed above, the fine particles incorporated in the polyamide matrix should be elastomeric. In order to obtain such rubber-like qualities it is desirable to employ a carboxyl terminated polyester which is itself elastomeric, i.e., has a glass transition temperature below 50°F and preferably below −20°F, and is crosslinkable through these carboxylic end groups with a diepoxy resin into an elastomeric substance. Exemplary of the numerous commercially available polyesters exhibiting such preferred Tg levels are the following: cis and trans poly [1,4 (2-butene)sebacate], poly [1,4-(2-butyne)sebacate], poly(decamethylene adipate), poly(ethylene adipate), poly(2,2,3,4,4-hexafluoropentamethylene adipate), poly(oxydiethylene adipate), poly(oxydiethylene azelaate), poly(oxydiethylene dodecanedioate), poly(oxydiethylene glutarate), poly(oxydiethylene malonate), poly(oxydiethylene nonylmalonate), poly(oxydiethylene octadecanedioate), poly(oxydiethylene oxalate), poly(oxydiethylene pentylmalonate), poly(oxydiethylene pimelate), poly(oxydiethylene propylmalonate), poly(oxydiethylene sebacate), poly(oxydiethylene suberate), poly(oxydiethylene succinate), poly(pentamethylene adipate), poly(tetramethylene sebacate), poly(trimethylene adipate) and the many polyester copolymers obtainable by copolymerizing the monomeric constituents of these homopolymes. Of course, numerous additional carboxy terminated polyesters, which are prepared by conventional polycondensation reactions, may be employed as long as they are within the proper number average molecular weight range and will react with a given diepoxide to form an elastomeric material.

Suitable diepoxides for reaction with the copolymer include both aromatic and aliphatic diepoxides. Typical diepoxides which are suitable include resorcinol diglycidyl ether, diglycidyl ether of 4,4'-isopropylidenediphenol, (otherwise known as bisphenol A diglycidyl ether), vinyl cyclohexene dioxide, 3,4-epoxy-6-methyl-cyclohexylmethyl-3,4-epoxy-6-methylcyclohexanecarboxylate, and butanediol diglycidyl ether.

Reaction of the diepoxide with the carboxyl bearing polymer or copolymer is advantageously carried out at temperatures in the range of about 50°C to about 170°C preferably 70°C to 120°C, even though this reaction will proceed slowly at room temperature. The time allotted for this reaction can be in the range of about 10 minutes to about 4 hours but is preferably in the range of about 30 to about 90 minutes. The relative concentrations of the copolymer and the epoxide are advantageously controlled to provide epoxy/carboxy group ratios in the range of about 1.0 to 1.0 to about 6.0 to 1.0, preferably about 1.5 to 1.0 to about 3.0 to 1.0. In the final composition with polyamides, excessive epoxy content leads to hard inclusions whereas insufficient epoxy content leads to poorly crosslinked inclusions lacking tear strength.

Suitable catalysts for use with this reaction include (a) tetraalkyl ammonium salts, preferably the bromides and iodides because of their relatively low melting points, (b) tertiary amines, e.g., triethyl amine, N,N-dimethyl benzyl amine, N,N-dimethyl ethanol amine, etc., (c) aromatic amines, e.g., aniline, and (d) heterocyclic nitrogen compounds, e.g., pyridine, imidazole, etc.

The dispersion of the hydroxy and epoxy functional reaction product with the polyamide is advantageously carried out using about 6 to about 70 parts by weight of the reaction product per 100 parts by weight of the polyamide, preferably about 15 to about 40 parts by weight per 100 parts by weight of polyamide.

Dispersion during blending or molding and simultaneous crosslinking and grafting is advantageously carried out at temperatures in the range of about 170°C to about 350°C, preferably about 230°C to about 290°C depending on the type of polyamide to be used. Hence, polyamides are used which are in the liquid state of temperatures in the range of about 180°C to about 380°C. The residence time in the blending equipment or injection molding machine can vary in the range of about 0.5 to about 20 minutes, but is preferably in the range of about 2 to about 10 minutes. Convenient crosslink densities in the rubbery phrase are obtained at catalyst concentrations in the range of about 0.1% to about 5% by weight with respect to the rubber component. Suitable catalysts for this reaction include (a) heterocyclic nitrogen compounds, e.g., piperidine, imidazole, etc. and (b) tertiary amines, e.g, N,N-dimethyl benzyl amine, N,N-dimethyl ethanol amine, etc.

Solvent evaporation is effected prior to extrusion to reduce the solvent content to below about 0.5%. It will be understood that these materials may be reinforced with particulate filler, e.g., carbon black, inorganic particulate material including glass fibers, etc. The term "particulate filler" as used in this application means particulate material used either to provide color, e.g., pigment, to the thermoplastic material or to modify the physical properties of the thermoplastic material as, for example, to increase its structural strength, but which is not chemically bonded to the thermoplastic material.

This invention will be more fully understood from the following illustrative examples.

EXAMPLE 1

To 548 grams (0.166 moles) of a copolymer having carboxylic acid end groups (composition about 19 mole percent acrylonitrile, about 0.3 mole percent acrylic acid, about 2% remnants of the carboxylic acid group containing radical initiator, and a remainder of butadiene), a number average molecular weight of 3300, and a viscosity of 140,000 cps at 27°C, hereinafter called "Copolymer I," is added 78 grams (0.225 moles) of the diglycidyl ether of Bisphenol-A of number average molecular weight 344 and viscosity 5,000 cps at 25°C, hereinafter called "Epoxy Resin I." This mixture is stirred at 150°C for 3 hours and then cooled. During this time, epoxy end groups from the diepoxide react with acid end groups from the dicarboxylic acid to form ester linkages and hydroxyl groups. This chain extension process is limited by the excess epoxy present. Thus, the resulting macromolecules consist of chains containing epoxy groups at both ends and hydroxyl groups along the chain. The resulting liquid prepolymer is dark brown and very viscous. To catalyze the reaction of these terminal epoxy groups with amide groups of a thermoplastic polyamide, 3 grams of N,N-dimethyl benzyl amine is added to this liquid prepolymer prior to blending it with the polyamide.

There is cold blended 150 grams of this prepolymer with 3,000 grams of polycaprolactam (otherwise known as nylon 6) containing a small amount of titanium dioxide which serves as a nucleating agent. This blend is directly injection molded using a forced feed hopper. Residence time in the barrel is set at 10 minutes. Barrel temperatures are 470°F. (near hopper) to 475°F (at nozzle). Mold temperature is set at 200°F. Screw back pressure is set at 100 psi. During this operation, the prepolymer disperses in about 1 micron droplets, or smaller, in the nylon 6 matrix. Simultaneously, under influence of the amine catalyst, the prepolymer is being crosslined both through its terminal epoxy groups and in conjunction with available hydroxyl groups. Thus, the liquid prepolymer droplets are converted into solid rubbery particles. Under influence of the amine catalyst, epoxy groups at the boundaries of the rubbery particles are grafted onto available amide groups or terminal amine groups of the nylon 6. In addition, some nylon 6 chain degradation may take place due to the presence of hydroxyl groups at the surface of the rubbery particle, also resulting in graft structures at the interface.

The resulting composite in the dry as-molded state has a heat deflection temperature of 155°F at 264 psi (ASTM-Test No. D648-56), a tensile modulus of 285,000 psi at 75°F and a brittleness temperature* of plus 5°F.

*To investigate the brittleness of structural plastics in automotive applications a new impact test has been designed. In this test, named "Dynaflex Test," the specimen undergoes a flexural impact similar to the "fold away" mode experienced during abuse of automotive body panels.
A flat specimen is clamped like a cantilever on a steel vise, whose clamping surfaces are softened with rubber sheets of about 2 mm thickness. The plane parallel with the largest surface of the specimen makes an angle of 30° with the horizontal. About half the specimen is supported by the vise, and about four inches (or 10 cm) of the specimen protrudes past the mandrel. Under this cantilever is placed an interchangeable mandrel with a given radius. During the impact the specimen is quickly folded around the mandrel and can be either quickly released or kept in that deformed position for a certain length of time before it is released. The ram which flexes the specimen around the mandrel is also cylindrically shaped, with a radius of curvature of ¾ inches, weighs 5 kilograms and slides smoothly along two shafts on ball bearings. The height of the ram is adjustable and its free fall is initiated by a release-pin located on a third shaft. The vise and three shafts are mounted on a heavy base.

In the brittleness evaluation of the present patent application the chosen radius of curvature of the mandrel was 1 inch, the thickness of the specimens was kept constant at ⅛ inch, the width of the specimens was ½ inch, the speed of impact was 1.85 meters/sec. corresponding to a ram height above the specimen of about 14 inches. The specimens were kept dry as molded and were tested in an environmental chamber at various temperatures. The temperature at which 20% of the samples failed was labeled at the brittleness temperature. The impact mode was always "dynamic, i.e., flexed and immediately released. Most specimens which survived recovered almost immediately to their initial shape. Most specimens which fractured did so in a brittle manner.

It should be noted, that the heat deflection temperature data in this patent application were always measured on ½ inch thick and ⅛ inch wide samples.

EXAMPLE 2

To 426 grams (or 0.129 moles) of Copolymer I of Example 1 is added 72 grams (or 0.209 moles) of Epoxy Resin I of Example 1 and 2 grams tetrabutyl ammonium iodide. The ammonium salt acts as a catalyst and preferentially catalyzes the epoxy/acid reaction and allows the esterification reaction to proceed at lower temperatures. This mixture is stirred at 70°C for 1 hour and then cooled. Under these conditions, the chain extension process is not carried to completion. The resulting liquid prepolymer mixture has a much lower viscosity and a longer room temperature stability than in the case when chain extension is completed. Completion of the reaction will take place in the extruder or injection molding barrel before the nylon reaches its melting temperature of about 220°C so that no additional degradation of the nylon by carboxylic acid groups takes place. To catalyze the reaction of epoxy and hydroxyl groups with each other and with nylon, 4 grams of 2-ethyl-4-methyl imidazole is added to this liquid prepolymer mixture prior to blending it with the polyamide.

Three hundred (300) grams of this prepolymer mixture is cold blended with 3,000 grams of a composite of 86 weight percent nylon 6 and 14 weight percent short glass fibers. This mixture is directly injection molded, using a forced feed hopper. Residence time in the barrel is set at 8 minutes. Barrel temperatures are adjusted to 490°F (near hopper) to 500°F (at nozzle). Mold temperature is 220°F. Screw back pressure is set at 350 psi to enhance thorough mixing of components during transport through the barrel. Dispersion of the prepolymer in the nylon 6 Matrix and subsequent cross-linking and grafting at the interface takes place as described in Example 1.

The resulting composite in the dry as-molded state has a heat deflection temperature, hereinafter called HDT, of 374°F at 264 psi, a tensile modulus of 410,000 psi at 75°F and a brittleness temperature of plus 10°F.

EXAMPLE 3

To 796 grams (or 0.179 moles) of a copolymer having carboxylic acid end groups terminating a polybutadiene chain containing 22% cis, 53% trans and 25% vinyl unsaturation, number average molecular weight of 4450, and viscosity of 40,000 cps at 27°C, hereinafter called "Copolymer II" is added 187 grams (or 0.505 moles) of the diglycidyl ether of bisphenol-A of number average molecular weight 370 and viscosity 14,000 cps at 25°C, hereinafter called "Epoxy Resin II." To this mixture is added 2 grams tetrabutyl ammonium iodide as in Example 2 and the mixture is stirred at 100°C for 1.5 hours. It is then cooled. Under these conditions, the chain extension process is not carried to completion. Copolymer II reacts more slowly with epoxy resins than does Copolymer I. In both cases, however, reaction of carboxyl groups continues to take place during storage at room temperature. To catalyze the reaction of epoxy and hydroxyl groups with each other and with nylon, 3 grams of a mixture of 2-methyl-imidazole, 2-methyl-4-ethyl imidazole and higher molecular weight imidazoles is added to this liquid prepolymer mixture prior to blending it with nylon.

Five hundred (500) grams of this prepolymer mixture are cold blended with 966 grams of polyamide pellets consisting of 90% nylon 6 and 10% caprolactam and with 534 grams of pellets of a composite consisting of 70% nylon 6 and 30% short glass fibers. This mixture is directly injection molded, using a forced feed hopper. Residence time in the barrel is set at 7 minutes. Barrel temperatures are set at 480°F (near hopper) to 490°F (at nozzle). Mold temperature is kept at 210°F. Screw back pressure is set at 300 psi to enhance thorough mixing of components during transport through the barrel.

The resulting composite in the dry as-molded state has a heat distortion temperature (HDT) of 210°F at 264 psi, a tensile modulus of 90,000 psi at 75°F and a brittleness temperature below −40°F.

EXAMPLE 4

To 1088 grams (or 0.244 moles) of Copolymer II of Example 3 is added 170 grams (or 0.494 mole) of Epoxy Resin I and 3 grams of tributyl-ethyl ammonium iodide as catalyst. This mixture is being stirred at 110°C for 1 hour and then cooled. To catalyze the reaction of epoxy and hydroxyl groups with each other and with nylon, an amount of 4 grams 2-methyl imidazole is added to this prepolymer mixture prior to blending it with nylon.

Five hundred (500) grams of this prepolymer mixture is cold blended with 966 grams of polyamide pellets containing 88% of nylon 6 and 12% caprolactam. This mixture is extruded in a 2 inch diameter screw extruder using a forced feed hopper. Residence time in the barrel is kept at 1.5 minutes. Barrel temperatures are kept at 500°F (near hopper) to 505°F (near exit). The extrudate is cooled by passing through a water trough and then pelletized. It is subsequently dried for 48 hours at 180°F. This dried extrudate in the amount of 1466 grams is then dry blended with 532 grams of nylon 6 containing 30% short glass fibers. This mixture is injection molded using a constant barrel temperature of 480°F, a mold temperature of 200°F and a back pressure of 60 psi.

The resulting composite in the dry as-molded state has a HDT of 200°F at 264 psi, a tensile modulus of 155,000 psi at 75°F and a brittleness temperature of −20°F.

EXAMPLE 5

To a mixture of 1155 grams (or 0.350 moles) of Copolymer I, 890 grams (or 0.200 moles) or Copolymer II and 1 gram (or 0.0035 moles) of stearic acid is added 390 grams (or 1.055 moles) of Epoxy Resin II, 5 grams of tetrabutyl ammonium iodide and 5 grams triethylbutyl ammonium iodide. This mixture is stirred at 110°C for 1 hour and then cooled. To catalyze the reaction of epoxy and hydroxyl groups with each other and with nylon, 10 grams of imidazole mixture catalyst of Example 3 is added prior to blending with nylon.

Four hundred (400) grams of this prepolymer mixture is cold blended with 1066 grams of a commercially available olefin grafted nylon 6 (Plaskon 8252 — Allied Chemicals Corporation). This mixture is extruded in a 2 inch diameter screw extruder using a forced feed hopper. Residence time in the barrel is kept at 1 minute. Barrel temperatures are maintained at 510°F (near hopper) to 520°F (near exit). The extrudate is cooled by passing through a water trough, is then pelletized, and subsequently dried for 48 hours at 180°F. This dried extrudate, in the amount of 1466 grams, is dry blended with 532 grams of nylon 6 containing 30% short glass fibers. This mixture is injection molded using a constant barrel temperature of 510°F. a mold temperature of 210°F. and a back pressure of 100 psi.

The resulting composite in the dry-as-molded state has an HDT of 150°F at 264 psi, a tensile modulus of 220,000 psi at 75°F and a brittleness temperature of −30°F.

EXAMPLE 6

To a mixture of 1155 grams (0.350 moles) of Copolymer I of Example 1 and 890 grams (0.200 moles) of Copolymer II of Example 3 is added 412 grams (1.20 moles) of Epoxy Resin I of Example 1 and 9 grams (0.4 weight percent) of tetrabutyl ammonium iodide. The ammonium salt acts as a catalyst and preferentially catalyzes the epoxy/acid reaction and allows the esterification reaction to proceed at a lower temperature. This mixture is stirred at 110°C for 1 hour and then cooled. Under these conditions, the chain extension process is carried nearly to completion with the extension being limited by the excess epoxy present. Thus, the resulting macromolecules consist of chains containing epoxy groups at both ends and hydroxyl groups along the chain. To catalyze the reaction of these terminal epoxy groups with amide groups of a thermoplastic polyamide, 9 grams (0.4 weight percent) of 2-methyl-4-ethyl imidazole is added to this liquid prepolymer prior to blending it with the polyamide.

Two hundred (200) grams of this prepolymer mixture is cold blended with 434 grams of polycaprolactam (Nylon 6) and 1 gram of talc. This mixture is extruded in a two inch diameter screw extruder using a forced feed hopper. Residence time in the barrel is kept at 1.5 minutes and barrel temperatures are maintained at about 510°F. The extrudate is cooled by passing through a water trough and then pelletized. It is subsequently dried for 24 hours at 170°F.

The dried extrudate in the amount of 634 grams is then dry blended with 366 grams of pellets of a composite consisting of 70% nylon 6 and 30% glass fibers. This mixture is then injection molded. Barrel temperatures are set at 480°F and the mold temperature is kept at 210°F. Screw back pressure is set at 200 psi to enhance thorough mixing of components during transport through the barrel.

The resulting composite in the dry-as-molded state has a heat distortion temperature (HDT) of 304°F at 264 psi, a tensile modulus of 330,000 psi at 75°F, a brittleness temperature of −30°F and a tensile strength of 10,000 psi.

EXAMPLE 7

To a mixture of 1155 grams (0.350) moles of Copolymer I of Example 1 and 890 grams (0.200 moles) of Copolymer II of Example 3 is added 412 grams of Epoxy Resin I and 9.8 grams (0.4 weight percent) of tetrabutyl ammonium iodide as catalyst. This mixture is stirred at 110°C for 1 hour and then cooled. To catalyze the reaction of epoxy and hydroxyl groups with each other and with nylon, an amount of 9.8 grams (0.4 weight percent) of 2-methyl-4-ethyl imidazole is added to this prepolymer mixture prior to blending it with nylon.

Two hundred thirty (230) grams of this prepolymer mixture is cold blended with 512 grams of Nylon 6,6 pellets. This mixture is extruded in a 2 inch diameter screw extruder using a forced feed hopper. Residence time in the barrel is kept at 1.5 minutes. Barrel temperatures are kept at 560°F. The extrudate is cooled by passing through a water trough and then pelletized. It is subsequently dried for 24 hours at 180°F. This dried extrudate in the amount of 742 grams is then dry blended with 258 grams of pellets of a composite including 67% Nylon 6,6 and 33% glass fibers. This mixture is injection molded using a constant barrel temperature of 560°F, a mold temperature of 190°F and a back pressure of 50 psi.

The resulting composite in the dry-as-molded stated has a HDT of 312°F at 264 psi, a tensile modulus of 350,000 psi at 75°F, a brittleness temperature of −15°F and a tensile strength of 10,700 psi.

EXAMPLE 8

To 1090 grams (0.500 moles) of a copolymer having randomly distributed carboxylic acid groups (composition about 26 weight percent acrylonitrile, 66.8 weight percent butadiene, 6.6 weight percent acrylic acid and 0.6 weight percent remnants of a radical initiator), a number average molecular weight of 2180, a viscosity of 600 poises at room temperature, and an average functionality of 3.5, hereinafter called "Copolymer III," is added 890 grams (0.200 moles) of Copolymer II from Example 3, 550 grams (1,600 moles) of Epoxy resin I and 9 grams (0.30 weight percent) of tetrabutyl ammonium iodide as catalyst. This mixture is stirred at 100°C for 45 minutes and then cooled. To catalyze the reaction of epoxy and hydroxyl groups with each other and with nylon, 9 grams (0.3 weight percent) of a mixture of 2-methyl-imidazole, 2-methyl-4-ethyl imidazole and higher molecular weight imidazoles is added to this liquid prepolymer mixture prior to blending it with nylon.

Two hundred fifty (250) grams of this prepolymer mixture is cold blended with 750 grams of polyamide pellets containing 87% of nylon 6,6 and 13% of glass fibers. This mixture is directly injection molded, using a forced feed hopper. Residence time in the barrel is set at 8 minutes. Barrel temperatures are adjusted to 560°F, mold temperature is maintained at 190°F and screw back pressure is set at 350 psi to enhance thorough mixing of components during transport through the barrel.

The resulting composite in the dry-as-molded state has an HDT of 254°F at 264 psi, a tensile modulus of 250,000 psi at 75°F, a brittleness temperature of −15°F and a tensile strength of 8,200 psi.

EXAMPLE 9

To 1090 grams (0.500 moles) of Copolymer III from Example 8 is added 890 grams (0.200 moles) of Copolymer II from Example 3, 550 grams (1.600 moles) of Epoxy Resin 1 and 9 grams (0.3 weight percent) of tetrabutyl ammonium iodide as catalyst. This mixture is stirred at 100°C for 45 minutes and then cooled. To catalyze the reaction of epoxy and hydroxyl groups with each other and with nylon, 12 grams (0.4 weight percent) of 2,4,6 tris(dimethylamino) methyl phenol is added to this prepolymer mixture prior to blending it with nylon.

Two hundred thirty (230) grams of this prepolymer mixture is cold blended with 780 grams of polyamide pellets containing 85% Nylon 6 and 15% glass fibers. This mixture is directly injection molded, using a forced feed hopper. Residence time in the barrel is set at 8 minutes. Barrel temperature is adjusted to 490°F, mold temperature is maintained at 190°F and screw back pressure is set at 550 psi to enhance thorough mixing of components during transport through the barrel.

The resulting composite in the dry-as-molded state has a heat deflection temperature, hereinafter called HDT of 228°F at 264 psi, a tensile modulus of 245,000 psi, a brittleness temperature of −30°F and a tensile strength of 7,400 psi.

EXAMPLE 10

To 1400 grams (0.50 moles) of a linear carboxy terminated polyester (composition about 40% diethylene glycol and 60% adipic acid, made by heating the diol and diacid at 200° to 230°C, while stirring and bubbling dry nitrogen gas through the liquid, until almost all of the OH groups have reacted (about 3 days) having a number average molecular weight of 2800, a viscosity at 75°F of 223 poises and a water content of 0.06%, hereinafter called "Polyester I" is added 358 grams (1.05 moles) of Epoxy Resin i and 5.3 grams (0.3 weight percent) of tetrabutyl ammonium iodide. This mixture is stirred 2.5 hours at 100°C and then cooled. To catalyze the reaction of epoxy and hydroxyl groups with each other and with nylon, 14 grams (0.8 weight percent) of 2,4,6 tris(dimethylamino) methyl phenol is added to this prepolymer mixture prior to blending it with nylon.

Two hundred (200) grams of this prepolymer mixture is cold blended with 800 grams of polyamide pellets containing 86% nylon 6 and 14% glass fibers. This mixture is injection molded directly, using a forced feed hopper. Residence time in the barrel is set at 8 minutes. Barrel temperature is adjusted to 500°F, mold temperature is maintained at 190°F and screw back pressure is set at 300 psi to enhance thorough mixing of components during transport through the barrel.

The resulting composite in the dry-as-molded state has a heat distortion temperature (HDT) of 250°F, at 264 psi a tensile modulus of 290,000 psi at 75°F, a brittleness temperature of −30°F and a tensile strength of 8,900 psi.

EXAMPLE 11

To 1480 grams (0.50 moles) of a linear carboxy terminated polyester consisting of 21.3% diethylene glycol, 15.2% propylene glycol and 63.5% adipic acid, having a number average molecular weight of 2960, a viscosity at 75°F of 268 poises and a water content of 0.04%, hereafter called Polyester II, is added 409 grams (1.1 moles) of diglycidyl ether of 2-methylol, 4,4-isopropylidene diphenol, hereinafter called Epoxy Resin III and 5.7 grams (0.3 weight percent) of tetrabutyl ammonium iodide. This mixture is stirred 1.5 hours at 100°C and then cooled. To catalyze the reaction of epoxy and hydroxyl groups with each other and with nylon 15.1 grams (0.8 weight percent) of 2,4,6 tris(-dimethylamino) methyl phenol is added to the prepolymer mixture prior to blending it with nylon.

Two hundred (200) grams of this prepolymer mixture is cold blended with 800 grams of polyamide pellets containing 86% Nylon 6 and 14% glass fibers. This mixture is directly injection molded, using a forced feed hopper. Residence time in the barrel is set at 8 minutes. Barrel temperature is adjusted to 490°F, mold temperature is maintained at 190°F and screw back pressure is set at 300 psi to enhance thorough mixing of components during transport through the barrel.

The resulting composite in the dry-as-molded state has an HDT of 285°F at 264 psi, a tensile modulus of 350,000 psi at 75°F, a brittleness temperature of −30°F and a tensile strength of 10,300 psi.

EXAMPLE 12

To 280 grams (0.10 moles) of Polyester I from Example 10 is added 82 grams (0.22 moles) of Epoxy Resin III and .9 grams (0.25%) of tetrabutylammonium iodide. This mixture is stirred at 100°C for 1.5 hours and then cooled. To catalyze the reaction of epoxy and hydroxyl groups with each other and with nylon, 1.8 grams (0.5 weight percent) of 1.4 diazabicyclo (2,2,2) octane is added to this prepolymer mixture prior to blending it with nylon.

Two hundred (200) grams of this prepolymer mixture is cold blended with 680 g of Nylon 6, 120 grams of chopped glass (¼inches in length) and 1 gram of talc. This mixture is directly injection molded, using a forced feed hopper. Residence time in the barrel is set at 8 minutes. Barrel temperature is adjusted to 490°F, mold temperature is maintained at 190°F and screw back pressure is set at 300 psi.

The resulting composite in the dry-as-molded state has an HDT of 302°F at 264 psi, a tensile modulus of 380,000 psi at 75°F, a brittleness temperature of −20°F and a tensile strength of 9700 psi.

The term "copolymer" as used herein means a polymer formed from at least two different monomers.

The invention disclosed will have many modifications which will be apparent to those skilled in the art in view of the teachings of this specification. It is intended that all modifications which fall within the true spirit and scope of this invention be included within the scope of the appended claims.

I claim:

1. A thermoplastic material which exclusive of particulate filler consists essentially of
   I. about 100 parts by weight of a continuous phase of a nylon having repeating carbonamide groups as an integral part of the polymeric chain, and
   II. about 6 to 70 parts by weight of a dispersed phase of crosslinked elastomer
      A. consisting essentially of carbon, hydrogen and oxygen,
      B. having epoxy and hydroxy functional groups prior to dispersion within said continuous phase,
      C. formed by reacting
         1. a diepoxide
            a. consisting essentially of carbon hydrogen and oxygen, and
            b. having average molecular weight in the range of about 200 to about 1000 with
         2. a carboxyl bearing polymer
            a. consisting essentially of carbon, hydrogen and oxygen,
            b. having average molecular weight in the range of about 1500 to about 10,000,
            c. having an average of about 1.5 to about 4.0 carboxyl groups per molecule, and
            d. being selected from the group consisting of carboxy terminated polyesters and polymers formed from polymerization of ethylenically unsaturated monomers, the relative concentrations of the diepoxide and the polymer being controlled to provide epoxy/carboxy group ratios in the range of about 1.0 to 1.0 to about 6.0 to 1.0,
   at a temperature in the range of about 50° to about 170°C, said elastomer being chemically bonded to said nylon at interfaces between said continuous phase and said dispersed phase by reacting said epoxy and hydroxy functional groups on said elastomer with amide groups on said nylon at a temperature in the range of about 170°C to about 350°C.

2. A thermoplastic material in accordance with claim 1 wherein said elastomer is present in a concentration in the range of about 15 to about 40 parts by weight per 100 parts by weight of said nylon, and said temperature is in the range of about 180°C to about 330°C.

3. A thermoplastic material in accordance with claim 1 wherein said carboxyl bearing polymer is a carboxyl terminated polymer.

4. A thermoplastic material in accordance with claim 3 wherein said carboxyl terminated polymer is a polyester.

5. A thermoplastic material in accordance with claim 4 wherein said polyester is a linear polyester having a molecular weight of between about 1500 and about 5,000.

6. A thermoplastic material in accordance with claim 1 wherein said carboxyl terminated polymer is a copolymer.

7. A thermoplastic material in accordance with claim 1 wherein said carboxyl bearing polymer is a copolymer containing randomly distributed carboxyl groups.

8. A thermoplastic material in accordance with claim 1 wherein said carboxyl bearing polymer is a copolymer including about 2 to about 4 mole percent of carboxyl providing units, about 50 to about 98 mole percent of olefinic hydrocarbon monomers and about 0 to about 48 mole percent of monomers selected from the group consisting of acrylates, methacrylates and nitriles.

9. A thermoplastic material in accordance with claim 1 wherein said carboxyl bearing polymer has average molecular weight in the range of about 3,000 to about 6,000, said elastomer is present in a concentration in the range of about 15 to about 40 parts by weight per 100 parts by weight of said nylon, said elastomer is reacted with said nylon at a temperature in the range of about 230°C to about 290°C, and said temperature for reaction of said elastomer with said nylon is maintained for a time in the range of about 0.5 to about 20 minutes.

10. A thermoplastic material in accordance with claim 9 wherein said temperature range is maintained for a time in the range of about 2 to about 10 minutes, and said carboxyl-terminated polymer has about 1.8 to about 2.5 carboxyl groups per molecule.

11. A thermoplastic material in accordance with claim 1 wherein said nylon is nylon 6.

12. A process for preparing a rubber-reinforced polyamide which comprises mixing 100 parts by weight of a nylon having repeating carbonamide groups as an integral part of the polymeric chain and about 6 to about 70 parts by weight of a crosslinked elastomer consisting essentially of carbon, hydrogen and oxygen and having epoxy and hydroxy functional groups prior to mixing with said nylon while both said nylon and said elastomer are in liquid state and continuing said mixing at least until there is formed a continuous phase of said nylon and a dispersed phase of said elastomer and chemically bonding said elastomer to said nylon at interfaces between said continuous phase and said dispersed phase by reacting said epoxy and hydroxy functional groups on said elastomer with amide groups on said nylon at a temperature in the range of about 170°C to about 350°C, said elastomer being further characterized by being formed by reacting at a temperature in the range of about 50°C to about 170°C
  1. a diepoxide
     a. consisting essentially of carbon, hydrogen and oxygen, and
     b. having average molecular weight in the range of about 200 to about 1000 with
  2. a carboxyl-bearing polymer
     a. consisting essentially of carbon, hydrogen and oxygen,
     b. having an average molecular weight in the range of about 1,500 to about 10,000, and
     c. having about 1.5 to about 4.0 carboxyl groups per molecule and
     d. being selected from the group consisting of carboxy terminated polyesters and polymers formed from polymerization of ethylenically unsaturated monomers, the relative concentration of the diepoxide and the polymer being controlled to provide epoxy/carboxy group ratios in the range of about 1.0 to 1.0 to about 6.0 to 1.0.

13. A process in accordance with claim 12 wherein said elastomer is present in a concentration in the range of about 15 to about 40 parts by weight per 100 parts by weight of said nylon, and said temperature is in the range of about 180°C to about 330°C.

14. A process in accordance with claim 13 wherein said time is in the range of about 2 to about 10 minutes.

15. A thermoplastic material in accordance with claim 12 wherein said carboxyl-bearing polymer is a carboxyl terminated polymer.

16. A thermoplastic material in accordance with claim 15 wherein said carboxyl terminated polymer is a polyester.

17. A thermoplastic material in accordance with claim 16 wherein said polyester is a linear polyester having a molecular weight of between about 1500 and about 5,000.

18. A thermoplastic material in accordance with claim 15 wherein said carboxyl terminated polymer is a copolymer.

19. A thermoplastic material in accordance with claim 12 wherein said carboxyl-bearing polymer is a copolymer containing randomly distributed carboxyl groups.

20. A thermoplastic material in accordance with claim 12 wherein said carboxyl-bearing polymer is a copolymer including about 2 to about 4 mole percent of carboxyl providing units, about 50 to about 98 mole percent of olefinic hydrocarbon monomers and about 0 to about 48 mole percent of monomers selected from the group consisting of acrylates, methacrylates and nitriles.

21. A process in accordance with claim 12 wherein said mixing and said chemical bonding are effected simultaneously.

22. A process in accordance with claim 12 wherein said nylon is nylon 6.

23. A process in accordance with claim 12 wherein said carboxyl-bearing polymer has average molecular weight in the range of about 3,000 to 6,000, said elastomer is present in a concentration in the range of about 15 to about 40 parts by weight per 100 parts by weight of said nylon, said elastomer is reacted with said nylon at a temperature in the range of about 230°C to about 290°C, and said temperature for reaction of said elastomer with said nylon is maintained for a time in the range of about 0.5 to about 20 minutes.

24. A process in accordance with claim 12 wherein said carboxy terminated polymer has about 1.8 and about 2.5 carboxyl groups per molecule.

* * * * *